(12) United States Patent  
Clark

(10) Patent No.: US 8,690,171 B2
(45) Date of Patent: Apr. 8, 2014

(54) INDIVIDUALLY STEERED REAR AXLE FOR DUAL PATH STEERED VEHICLES

(71) Applicant: AGCO Corporation, Duluth, GA (US)

(72) Inventor: Stanley R. Clark, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 13/719,847

(22) Filed: Dec. 19, 2012

(65) Prior Publication Data

US 2013/0154219 A1    Jun. 20, 2013

Related U.S. Application Data

(60) Provisional application No. 61/577,325, filed on Dec. 19, 2011.

(51) Int. Cl.
 *B62D 17/00* (2006.01)

(52) U.S. Cl.
 USPC .................................................. 280/86.751

(58) Field of Classification Search
 USPC ............... 280/86, 86.751; 180/411, 417, 435
 See application file for complete search history.

(56) References Cited

U.S. PATENT DOCUMENTS

| | | | | | |
|---|---|---|---|---|---|
| 2,425,516 | A | * | 8/1947 | De Witt | 280/92 |
| 2,808,269 | A | * | 10/1957 | Cathey | 280/93.5 |
| 3,075,233 | A | * | 1/1963 | Clyde | 16/35 R |
| 3,276,788 | A | * | 10/1966 | Sackler et al. | 280/80.1 |
| 5,221,100 | A | * | 6/1993 | McNutt | 280/78 |
| 7,159,687 | B2 | | 1/2007 | Dunn et al. | |
| 7,306,062 | B2 | | 12/2007 | Dunn | |
| 7,918,304 | B2 | | 4/2011 | Perry et al. | |
| 2005/0115746 | A1 | * | 6/2005 | Dunn et al. | 180/6.2 |
| 2009/0152828 | A1 | | 6/2009 | Bebernes et al. | |

* cited by examiner

*Primary Examiner* — Paul N Dickson
*Assistant Examiner* — Robert A Coker

(57) ABSTRACT

A caster wheel assembly selectively providing steering assist includes a pivoting shaft coupled with a caster wheel with an engagement lug connected to the shaft in a fixed manner. A steering arm selectively engages the engagement lug to couple the steering arm and engagement lug so that pivoting motion of the steering arm is transferred to the engagement lug. A turn assist cylinder connects to an outward end of the steering arm and an engagement mechanism acting upon the steering arm for engaging the steering arm with the engagement lug. When engaged, the steering arm is coupled with the engagement lug such that the turn assist cylinder pivots the shaft and caster wheel. When disengaged, the steering arm is uncoupled with the engagement lug such that the shaft and caster wheel are free to pivot independent of the turn assist cylinder.

8 Claims, 3 Drawing Sheets

INDIVIDUALLY STEERED REAR AXLE FOR DUAL PATH STEERED VEHICLES

RELATED APPLICATION

Under provisions of 35 U.S.C. §119(e), Applicants claim the benefit of U.S. Provisional Application No. 61/577,325 filed Dec. 19, 2011, which is incorporated herein by reference.

BACKGROUND OF THE INVENTION

1. Field of Invention

This invention relates to work machines, and, more particularly, to a steering assist arrangement for steering such work machines.

2. Description of Related Art

Self-propelled work machines such as windrowers are typically driven through a dual-path hydrostatic steering system. Speed changes are made by adjusting the speed of both drive wheels simultaneously. Direction changes are made by adjusting the relative speed of the drive wheels. Typically the non-drive wheels of the machine are castered to allow the machine to pivot during direction changes. The caster wheels are carried by the machine frame and are free to rotate 360 degrees about a generally vertical axis. The caster wheel assembly typically includes a shaft defining an axis of rotation, a wheel arm rigidly attached to the bottom end of the shaft, and a caster wheel coupled with the distal end of the wheel arm.

Steering characteristics of dual-path steering systems are dependent on such things as steering linkages, hydrostatic pump reaction time, the machine's turning inertia, and caster turn resistance. Turn resistance of the caster wheels results from friction in the pivot of the caster assembly and friction between the castered wheels and the ground. If the turn resistance is high enough to produce a noticeable delay in the reaction to the steering wheel input, control of the machine can be difficult. There is a tendency for a steering input to have a slow reaction or understeer at initiation, then a tendency to keep turning or oversteer when the input is stopped or reversed.

Because of this, control of the machine can be difficult, particularly at higher speeds. Windrowers typically have a maximum speed in transport in the miles per hour (mph) range. Transport speeds up to 25 mph would be an advantage in the market. This requires better machine controllability at higher speeds without sacrificing the agility of the current system at lower speeds. Reaction delay can be particularly pronounced if the machine is operated without the cutting header because the added weight on the casters results in increased turn resistance.

What is needed is a steering assist arrangement for a work machine providing turn assist for the rear caster wheels to assist the dual path steering during certain operations when improved steering response is desired and with the versatility to accommodate tight space restrictions.

OVERVIEW OF THE INVENTION

In one embodiment, the invention is directed a working vehicle having a pair of drive wheels for dual path steering and at least one caster wheel being part of a castor wheel assembly selectively providing steering assist to the working vehicle. The caster wheel assembly includes a pivoting shaft coupled with a caster wheel and an engagement lug connected to the shaft in a fixed manner such that the engagement lug pivots with the shaft. The caster wheel assembly also includes a steering arm selectively engagable with the engagement lug, the steering arm having an aperture formed therein configured to receive the engagement lug such that when the engagement lug is received in the aperture, the steering arm and engagement lug are coupled together and pivoting motion of the steering arm is transferred to the engagement lug. The caster wheel assemble also includes a turn assist cylinder connected to an outward end of the steering arm and an engagement mechanism acting upon the steering arm for engaging the steering arm with the engagement lug. The engagement mechanism has an engaged position and a disengaged position, wherein in one of the engaged and disengaged positions the steering arm is coupled with the engagement lug such that the turn assist cylinder pivots the shaft and caster wheel, and in the other of the engaged and disengaged position, the steering arm is uncoupled with the engagement lug such that the shaft and caster wheel are free to pivot independent of the turn assist cylinder. A locking cylinder connected to the engagement mechanism moves the engagement mechanism between the engaged position and the disengaged position.

In one embodiment, the engagement mechanism is a wedge shaped actuator that is extended and retracted by the locking cylinder. When the wedge-shaped actuator is in the engaged position, the steering arm slides down the sloped face of the wedge-shaped actuator under the biasing force of the locking spring such that the engagement lug is received within the aperture in the steering arm such that the turn assist cylinder provides a steering assist to the caster wheel.

These and other features and advantages of this invention are described in, or are apparent from, the following detailed description of various exemplary embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Corresponding reference characters indicate corresponding parts throughout the views of the drawings.

DESCRIPTION OF EXAMPLE EMBODIMENTS

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments.

Figure 1:
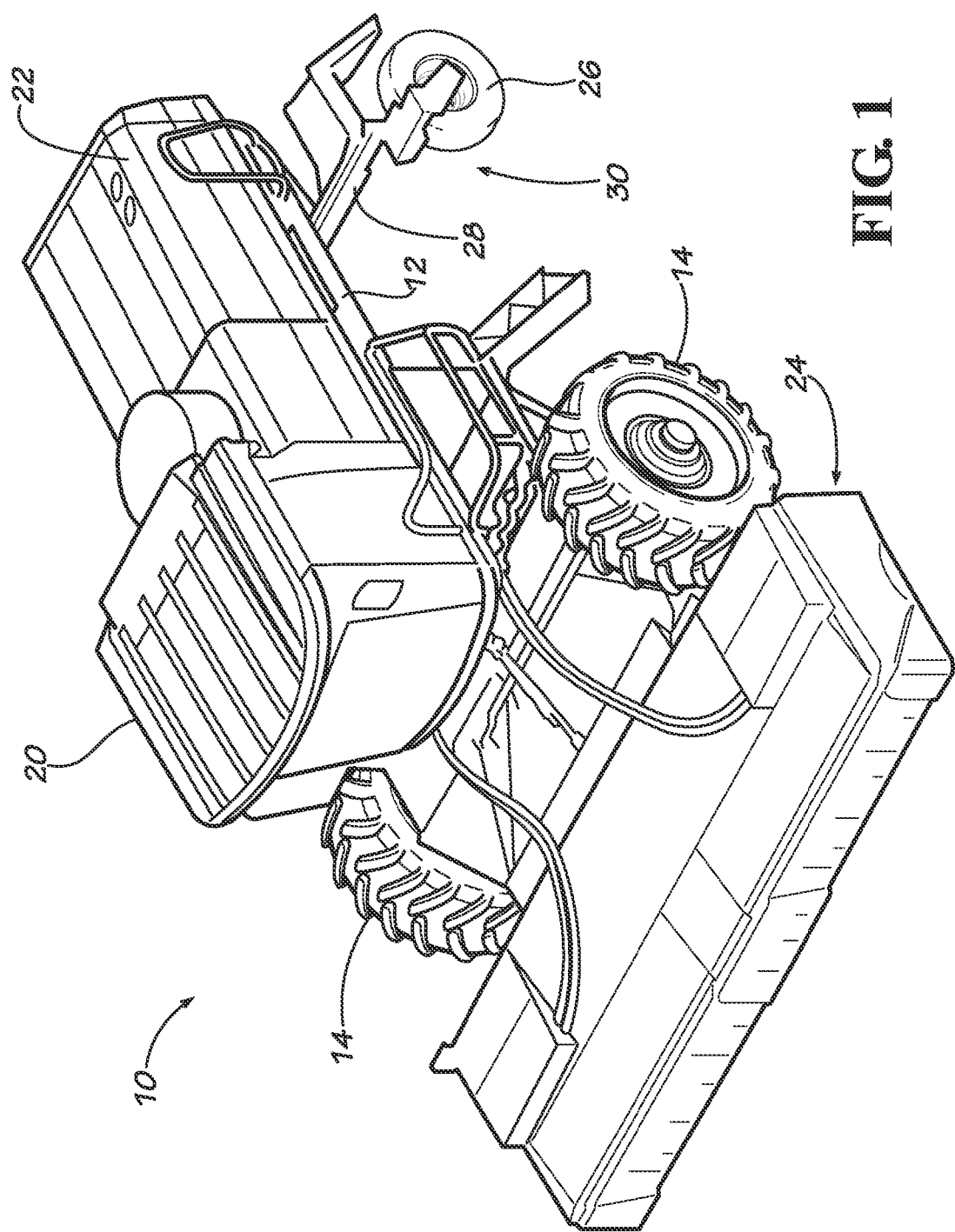
FIG. 1 is a perspective view of a work machine incorporating an embodiment of a caster wheel assembly having a turn assist arrangement of the present invention.

Referring now to the drawings, and more particularly to FIG. 1, there is shown a self-propelled windrower 10 using one or more caster wheels operable to mow and collect standing crop in the field, condition the cut material as it moves through the machine to improve its drying characteristics, and then return the conditioned material to the field in a windrow or swath. Although the invention will be described using a self-propelled windrower, one skilled in the art will understand that any self-propelled or pull-type working vehicle such as rotary mowers or combine having caster wheels may utilize the invention disclosed herein. The windrower 10 may include a chassis or frame 12 supported by drive wheels 14 for front dual path steering for movement across a field to be harvested as is known in the art. The frame 12 carries a cab 20, within which an operator controls operation of the windrower 10, and a rearwardly spaced engine compartment 22 housing a power source (not shown) such as an internal combustion engine. A harvesting header 24 is typically detachably mounted at the front end of the machine below the operator's cab in a manner understood by those skilled in the art. The engine compartment is typically mounted behind the operator's cab and above a pair of caster wheels 26. The machine frame 12 may include a telescoping axle 28 having an outboard end carrying each caster wheel 26.

Figure 2:
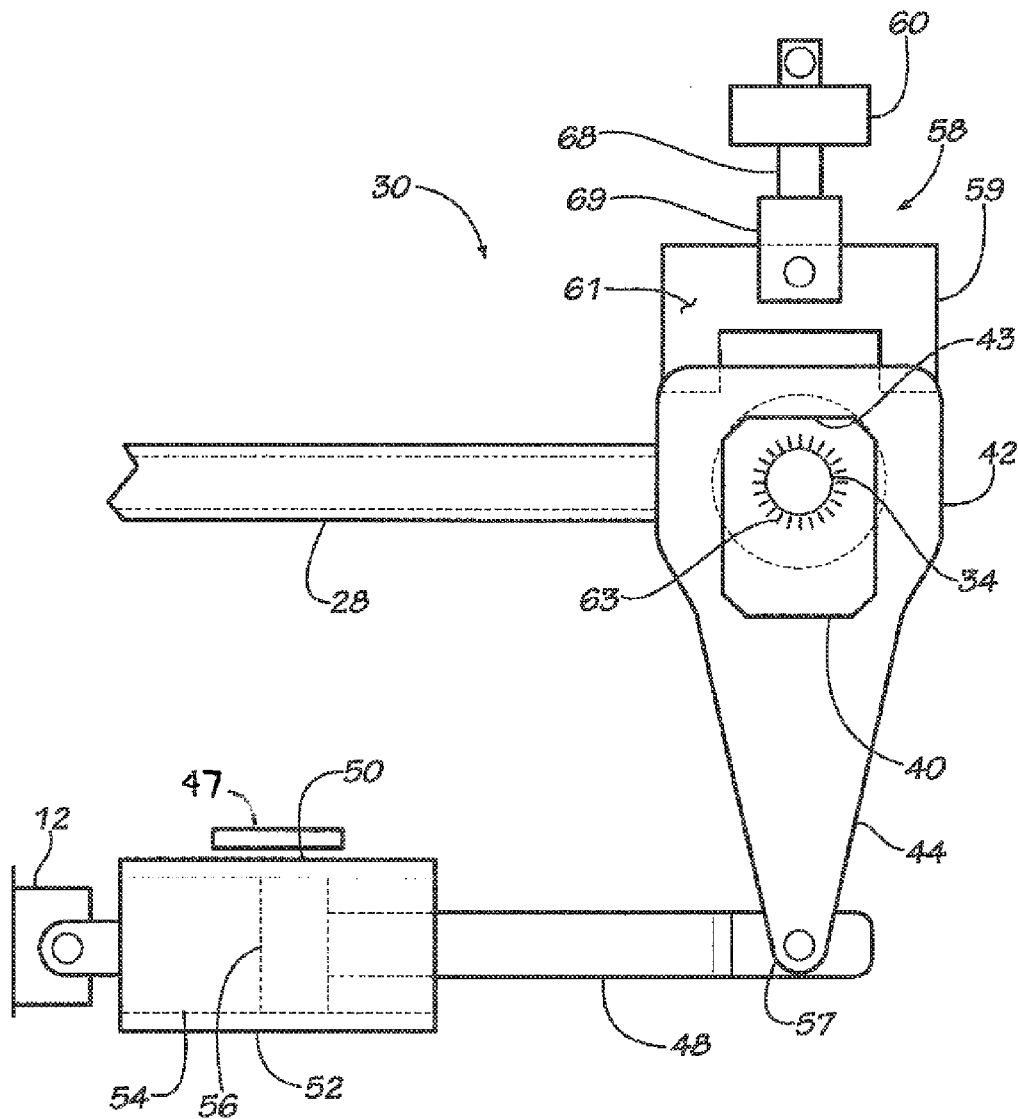
FIG. 2 is a top view of the caster wheel assembly of the work machine of FIG. 1.
Figure 3:
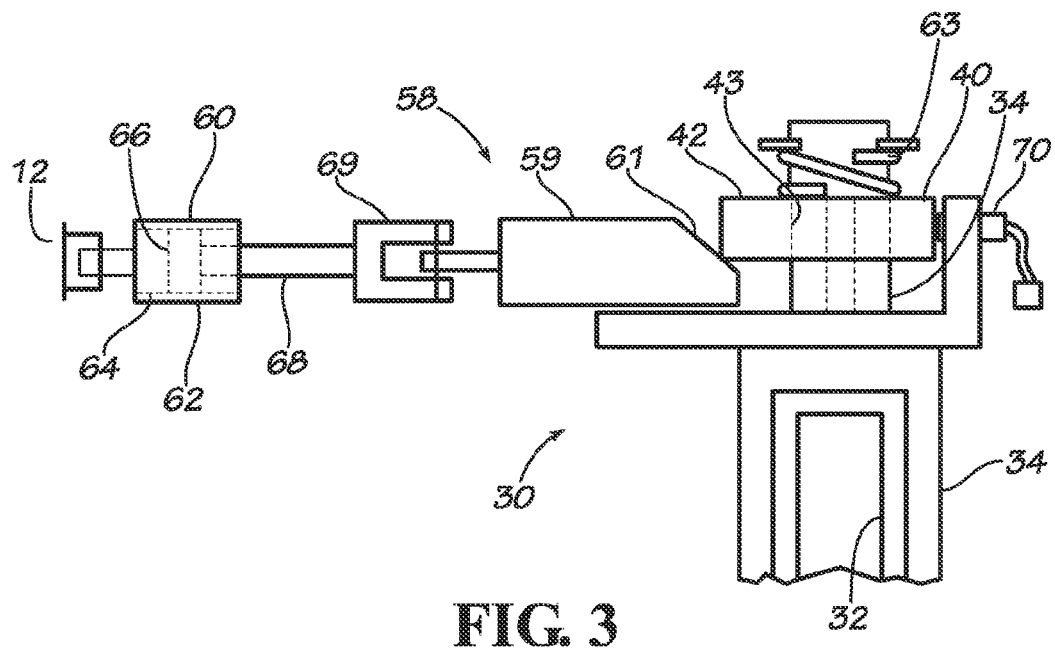
FIG. 3 is a side view of the caster wheel assembly of FIG. 2 in an engaged condition.
Figure 4:
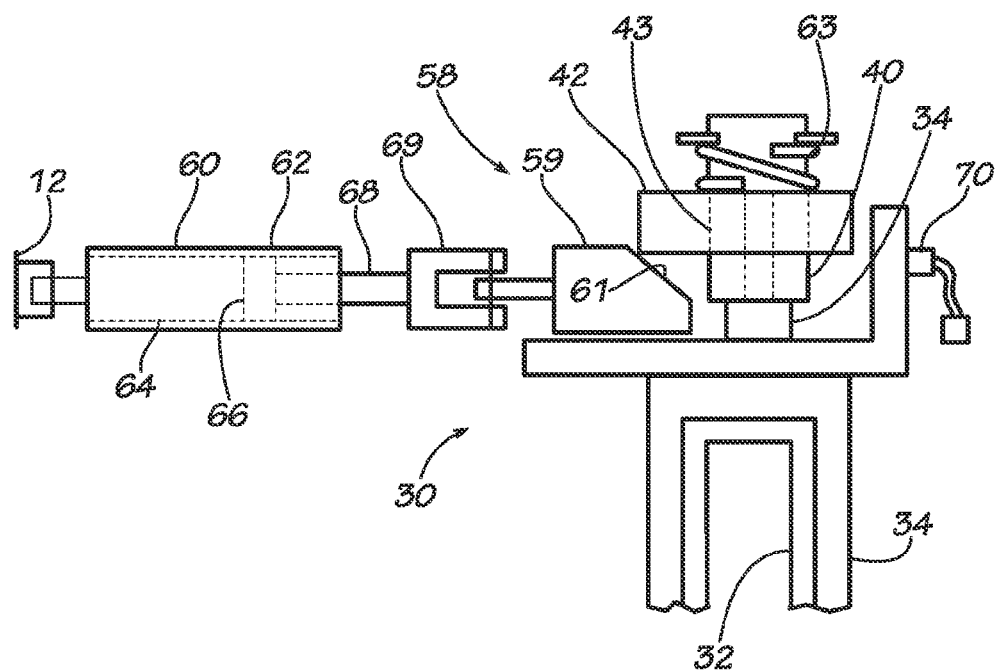
FIG. 4 is a side view of the caster wheel assembly of FIG. 2 in a disengaged condition.

According to the invention, each castor wheel 26 is part of a castor wheel assembly 30 that can be provided with steering assist in desired modes of operation to assist with the front dual path steering of the drive wheels 14 of the windrower 10. Turning now to FIGS. 2-4, there is shown one caster wheel assembly 30 incorporating an embodiment of a turn assist arrangement of the present invention. Only one caster wheel assembly 30 is shown in FIGS. 2-4 for simplicity, the other caster wheel assembly being configured substantially identical in the illustrated embodiment.

Each caster wheel assembly 24 includes wheel arm 32 coupled with the caster wheel 26 (FIG. 1). A portion of the wheel arm 32 is rotatably carried within a pivot tube 34 which is welded or otherwise rigidly affixed to the frame 12. The wheel arm 32 may be a fork with distal ends on opposite sides of the caster wheel 26 for mounting the wheel 26 in known fashion. Alternately, the wheel arm 32 may also be configured as a single arm which curves around to the side of the caster wheel 26 without departing from the scope of the invention. The wheel arm 32 is coupled to a pivotable shaft 34 at its upper end. An engagement lug 40 is connected to the shaft 30 in a fixed manner such that the engagement lug 40 pivots with the shaft 34 and wheel arm 32.

A steering arm 42 is selectively engagable with the engagement lug 40 associated with each caster wheel 26, such as through a suitable keyed connection. The steering arm 42 has an aperture 43 formed therein configured to receive the engagement lug 40 such that when the engagement lug 40 is received in the aperture 43, the steering arm 42 and engagement lug 40 are locked together and pivoting motion of the steering arm 42 is transferred to the engagement lug 42. In the illustrated embodiment, the engagement lug 40 has an offset rectangular shape that only meshes with the aperture 43 in the steering arm 42 when the engagement lug 40 and shaft 30, and thus the connected castor wheel 26, is in the forward straight position. However, other keying arrangements that require a specific orientation of the engagement lug 40 and the steering arm 42 in order for the components to mesh and engage may be used without departing from the scope of the invention. The steering arm 42 extends radially outward from the shaft 34 with the length of steering arm 42 being selected based upon the desired amount of turn assist force, etc.

The outward end 44 of the steering arm 42 is connected to a steering rod 48 controlled by a turn assist cylinder 50. Each turn assist cylinder 50 is in the form of a two-way cylinder with a housing 52 defining an inner chamber 54, a piston 56 slidably disposed within the inner chamber 54, and the steering rod 48 extending from the piston 56 through the housing 52 (interior components of turn assist cylinder 50 are shown in phantom lines in FIG. 2). The housing 52 is carried by the frame 12. The steering arm 42 is coupled with the steering rod 48 with a linkage 57. Linkage 57 may be of any suitable design, such as a ball linkage, using sound engineering judgment. The turn assist cylinder 50 has a suitable linear variable differential transformer (LVDT) 47 and is controlled by software and feedback from the LVDT as is known in the art.

Engagement and disengagement of the steering arm 42 with the engagement lug 40 occurs by lifting or lowering the steering arm 42 relative the engagement lug 40 using an engagement mechanism 58. In one embodiment, the engagement mechanism 58 includes a wedge shaped actuator 59 that is extended and retracted by a locking cylinder 60. When the wedge-shaped actuator 59 is in the engaged or retracted position as shown in FIG. 2, the steering arm 42 slides down the sloped face 61 of the wedge-shaped actuator 59 under the biasing force of a locking spring 63 such that the engagement lug 40 is received within the aperture in the steering arm 42. In this condition, the turn assist cylinder 50 provides a steering assist to the caster wheel 26. When the wedge-shaped actuator 59 is moved to the disengaged or extended position by extending the locking cylinder 60 as shown in FIG. 3, the steering arm 42 is forced upwards by the sloped face 61 of the wedge-shaped actuator 59 against the biasing force of the locking spring 63. This movement of the wedge-shaped actuator causes the steering arm 42 to be raised over the engagement lug 40, thereby uncoupling the steering arm 42 from the caster wheel 26. The locking cylinder 60 is in the form of a two-way cylinder with a housing 62 defining an inner chamber 64, a piston 66 slidably disposed in the inner chamber 64, and a locking rod 68 extending from the piston 66 through the housing 62 (interior components of locking cylinder 60 are shown in phantom lines in FIG. 2). The housing 62 is carried by the frame 12. The wedge-shaped actuator 59 is coupled with the locking rod 68 with a linkage 69. Linkage 69 may be of any suitable design using sound engineering judgment. While the illustrated embodiment shows the steering arm 42 being lifted off of the engagement lug 40 by the wedge-shaped actuator 59 to disengage the caster wheel 26 from the turn assist cylinder 50, one skilled in the art will understand that it is also possible to position the engagement lug 40 relative the steering arm 42 such that the wedge-shaped actuator 59 lifts the steering arm 42 into engagement with engagement lug 40 without departing from the scope of the invention.

Thus, when the steering arm 42 is moved into its engaged position by retracting the wedge-shaped actuator 59 with the locking cylinder 60 as shown in FIG. 2, the steering cylinder pivots the shaft 30 and caster wheel 26 to assist with the front dual path steering of the drive wheels 14 of the windrower 10 for operator commanded turns during higher speed transport or when the header 24 is removed from the windrower 10 for improved steering response. With the steering arm 42 in the disengaged position as shown in FIG. 3, the shaft 30 and engagement lug 40 pivot freely of the steering arm 42. This allows the caster wheel 26 to pivot freely such as for lower speed field operations. A sensor 70 to confirm the engagement/disengagement of the steering arm 42 with the engagement lug 40 is desirably provided. The sensor 70 permits warning the software and the operator if one side does not properly engage/disengage. The sensor 70 may be any known position sensor known to those skilled in the art.

In one embodiment, windrower 10 includes a pair of turn assist cylinders 50, with each turn assist cylinder 50 being coupled between frame 12 and a corresponding caster wheel 26. However, it is also possible to configure windrower 10 with a single turn assist cylinder 50 coupled between frame 12 and one caster wheel assembly 30, the other caster wheel 26 being free turning. Alternatively, windrower 10 may be configured with a single turn assist cylinder 50 coupled between frame 12 and one caster wheel assembly 30, the one caster wheel assembly being coupled via a tie rod or the like with the other caster wheel assembly.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

What is claimed is:

1. A working vehicle having a pair of drive wheels for dual path steering and at least one caster wheel being part of a castor wheel assembly selectively providing steering assist to the drive wheels, the caster wheel assembly comprising:
    a pivoting shaft coupled with a caster wheel;
    an engagement lug connected to the shaft in a fixed manner such that the engagement lug pivots with the shaft;
    a steering arm selectively engagable with the engagement lug, said steering arm having an aperture formed therein configured to receive the engagement lug such that when the engagement lug is received in the aperture, the steering arm and engagement lug are coupled together and pivoting motion of the steering arm is transferred to the engagement lug;
    a turn assist cylinder connected to an outward end of the steering arm;
    an engagement mechanism acting upon the steering arm for engaging the steering arm with the engagement lug, the engagement mechanism having an engaged position and a disengaged position, wherein in one of the engaged and disengaged positions the steering arm is coupled with the engagement lug such that the turn assist cylinder pivots the shaft and caster wheel, and in the other of the engaged and disengaged position, the steering arm is uncoupled with the engagement lug such that the shaft and caster wheel are free to pivot independent of the turn assist cylinder; and
    a locking cylinder connected to the engagement mechanism configured to move the engagement mechanism between the engaged position and the disengaged position.

2. The working vehicle of claim 1 further comprising a locking spring biasing the steering arm against a force of the engagement mechanism.

3. The working vehicle of claim 2 wherein the engagement mechanism comprises a wedge shaped actuator having a sloped face that is extended and retracted by the locking cylinder.

4. The working vehicle of claim 3 wherein when the wedge-shaped actuator is in the engaged position, the steering arm slides down the sloped face of the wedge-shaped actuator under a biasing force of the locking spring such that the engagement lug is received within the aperture in the steering arm such that the turn assist cylinder provides a steering assist to the caster wheel.

5. The working vehicle of claim 3 wherein when the wedge-shaped actuator is moved to the disengaged position by extending the locking cylinder as, the steering arm is forced upwards by the sloped face of the wedge-shaped actuator against a biasing force of the locking spring causing the steering arm to be raised over the engagement lug, thereby uncoupling the steering arm from the caster wheel.

6. The working vehicle of claim 1 wherein the engagement lug and the steering arm mesh in a keyed arrangement such that the engagement lug and steering arm may only be meshed in a certain orientation of the engagement lug relative the steering arm.

7. The working vehicle of claim 6 wherein the engagement lug has an offset rectangular shape that only meshes with the aperture in the steering arm when the castor wheel is in a forward straight position.

8. The working vehicle of claim 1 further comprising a linear variable differential transformer (LVDT) determining the condition of the turn assist cylinder.

* * * * *